(12) United States Patent
Anderson et al.

(10) Patent No.: US 10,592,079 B2
(45) Date of Patent: *Mar. 17, 2020

(54) THREE DIMENSIONAL HUMAN-COMPUTER INTERFACE

(71) Applicant: F. POSZAT HU, LLC, Wilmington, DE (US)

(72) Inventors: Paul Anderson, Kilmacolm (GB); Saquib Ibrahim, Glasgow (GB)

(73) Assignee: F. POSZAT HU, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,412

(22) Filed: Dec. 22, 2016

(65) Prior Publication Data

US 2017/0102859 A1    Apr. 13, 2017

Related U.S. Application Data

(63) Continuation of application No. 11/938,218, filed on Nov. 9, 2007, now Pat. No. 9,541,999, which is a (Continued)

(30) Foreign Application Priority Data

May 22, 2000    (GB) .................................... 0012275.4

(51) Int. Cl.
*G06F 3/0484*    (2013.01)
*G06F 3/01*    (2006.01)
(Continued)

(52) U.S. Cl.
CPC .......... *G06F 3/04845* (2013.01); *G06F 3/014* (2013.01); *G06F 3/04817* (2013.01); *G06F 3/165* (2013.01); *G06F 2203/04802* (2013.01)

(58) Field of Classification Search
CPC ................. G06F 3/04817; G06F 3/165; G06F 2203/04802
See application file for complete search history.

(56) References Cited

U.S. PATENT DOCUMENTS 5,184,319 A * 2/1993 Kramer .................... G06F 3/011
                                                                 345/156
5,381,158 A * 1/1995 Takahara ................ G06F 3/011
                                                                 345/156
(Continued)

FOREIGN PATENT DOCUMENTS

JP    H07-114451    5/1995
JP    9180003    7/1997
(Continued)

OTHER PUBLICATIONS

Watson, A Survey of Gesture Recognition Techniques Technical Report TCD-CS-93-11, Trinity College, Jul. 17, 1993, 31 pages (Year: 1993).*

(Continued)

*Primary Examiner* — Dorothy Harris
(74) *Attorney, Agent, or Firm* — Schwabe, Williamson & Wyatt

(57) ABSTRACT

A system includes a three dimensional display device configured to project computer generated controls and a target image in a three dimensional target volume; and an actuator configured to be worn by an operator. The system further includes one or more sensors configured to sense a movement of the actuator, wherein the controls are configured to be manipulated corresponding with the movement of the actuator within the target volume to alter an appearance of the target image.

14 Claims, 2 Drawing Sheets

Related U.S. Application Data continuation of application No. 10/276,992, filed as application No. PCT/GB01/02144 on May 17, 2001, now Pat. No. 7,312,786.

(51) Int. Cl.
*G06F 3/0481* (2013.01)
*G06F 3/16* (2006.01)

(56) References Cited

U.S. PATENT DOCUMENTS

| | | | | |
|---|---|---|---|---|
| 5,502,481 A | * | 3/1996 | Dentinger | G02B 27/0093 348/51 |
| 5,528,263 A | * | 6/1996 | Platzker | G06F 3/011 345/156 |
| 5,583,526 A | * | 12/1996 | Socks | G06F 3/011 345/7 |
| 5,583,977 A | | 12/1996 | Seidl | |
| 5,588,098 A | * | 12/1996 | Chen | G06F 3/04845 345/653 |
| 5,670,987 A | | 9/1997 | Doi et al. | |
| 5,801,704 A | * | 9/1998 | Oohara | G06F 3/011 345/157 |
| 5,807,114 A | * | 9/1998 | Hodges | A61M 21/00 434/219 |
| 5,821,925 A | | 10/1998 | Carey | |
| 5,831,584 A | | 11/1998 | Socks et al. | |
| 5,886,700 A | * | 3/1999 | Di Pippo | G06F 3/04815 345/419 |
| 5,886,818 A | | 3/1999 | Summer et al. | |
| 5,905,499 A | | 5/1999 | McDowall et al. | |
| 5,977,935 A | * | 11/1999 | Yasukawa | G02B 27/017 340/980 |
| 5,990,865 A | * | 11/1999 | Gard | G06F 3/011 345/156 |
| 6,061,064 A | * | 5/2000 | Reichlen | G06F 3/011 345/418 |
| 6,075,531 A | * | 6/2000 | DeStefano | G06F 3/04812 715/788 |
| 6,176,782 B1 | * | 1/2001 | Lyons | A63F 13/06 434/367 |
| 6,181,343 B1 | * | 1/2001 | Lyons | A63F 13/10 715/850 |
| 6,198,485 B1 | * | 3/2001 | Mack | G06F 3/013 345/419 |
| 6,211,848 B1 | | 4/2001 | Plesniak | |
| 6,346,929 B1 | * | 2/2002 | Fukushima | G06F 3/013 345/156 |
| 6,388,657 B1 | | 5/2002 | Natoli | |
| 6,600,480 B2 | * | 7/2003 | Natoli | G06F 3/014 345/156 |
| 6,720,949 B1 | | 4/2004 | Pryor et al. | |
| 6,765,566 B1 | * | 7/2004 | Tsao | H04N 13/0493 345/419 |
| 6,924,787 B2 | | 8/2005 | Kramer et al. | |
| 7,312,786 B2 | * | 12/2007 | Anderson | G06F 3/014 345/156 |
| 9,541,999 B2 | * | 1/2017 | Anderson | G06F 3/014 |
| 2001/0030642 A1 | * | 10/2001 | Sullivan | G06F 3/0421 345/157 |
| 2004/0080716 A1 | | 4/2004 | Anderson et al. | |
| 2008/0068376 A1 | | 3/2008 | Anderson et al. | |

FOREIGN PATENT DOCUMENTS

| | | |
|---|---|---|
| KR | 1020030024681 | 3/2003 |
| WO | WO 95/19584 | 7/1995 |
| WO | WO 01/90870 | 11/2001 |

OTHER PUBLICATIONS

Haruo Noma; Force and Visual Feedback for Manipulation Aid in Virtual Space; IEICE Technical Report; The Institute of Electronics, Information and Communication Engineers; Feb. 16, 1996; vol. 95, No. 524; pp. 9-18.

Shinji Uchiyama; Presentation and Interaction of Virtual 3D Objects without Geometric Model; vol. 3, No. 3; Transactions of the Virtual Reality Society of Japan; The Virtual Reality Society of Japan; Sep. 30, 1998; pp. 149-157.

Ronald T. Azuma; "A Survey of Augmented Reality"; Cambridge, MA, US; Aug. 1997; pp. 1-48; XP002254668.

European Patent Office, International Search Report for PCT/GB2001/002144, dated Oct. 30, 2001; 3 pages.

Hirata, Y. et al; "3-Dimensational Interface Device for virtual Work Space"; Proceedings of the IEEE/RSJ International Conference on Intelligent Robots and Systems; Raleigh, NC; Jul. 7-10, 1992; vol. 2; pp. 889-896; XP000333985; ISBN: 0-7803-0738-0.

Schwabe Williamson & Wyatt, P.C., "Listing of Related Cases", Mar. 29, 2018, 1 page.

* cited by examiner

THREE DIMENSIONAL HUMAN-COMPUTER INTERFACE

The present application is a continuation of U.S. patent application Ser. No. 11/938,218, filed on Nov. 9, 2007, which is a continuation of U.S. patent application Ser. No. 10/276,992, filed on Dec. 16, 2003, now U.S. Pat. No. 7,312,786, which is a US national phase application of PCT/GB2001/02144 filed, on May 17, 2001, which claims priority to GB0012275.4, filed on May 22, 2000, which are all herein incorporated by reference in their entireties.

DESCRIPTION

This invention relates to a three dimensional (3D) Human-Computer Interface (HCI), and a method of interacting with a 3D HCI. More specifically, it relates to a system of controls, sensors, tools and actuators that are designed to allow for easy manipulation of images, and any other data that is capable of being projected onto a 3D display system. The sensors and actuators extend in scope to body worn controls such as may be incorporated into a glove or into headgear, or other body worn apparatus, and to audio systems.

PRIOR ART

HCIs exist that have sensors mounted in items of clothing such as gloves. They are normally employed where the user of such a system is wearing a helmet mounted display. Sensors within the glove are used to communicate the position of the user's hand so that a "virtual" hand can be drawn onto the user's display. This way he can know the whereabouts of his hand in relation to other elements of the image.

This has the disadvantage that the user does not get a complete view of his hand, and any subtleties of motion that he is making will be lost. This occurs due to the limited number of sensors on the glove providing a finite resolution, coupled with inevitable errors and delays in the system that plot the position of the hand on to the display.

SUMMARY OF INVENTION

The present invention does not suffer these problems. Following calibration no "virtual" hand need be displayed. This will avoid problems of over correction present in the prior art that occur due to delay in updating the image as seen by the user whenever a hand movement is made. As the user of the present invention can see what hand movement has been made, he will not feel the need to redo them, or exaggerate the motion as he waits for the display to update.

There are HCI systems in existence that consist of haptic interfaces that provide hand positional information and haptic feedback that are used with two dimensional image projection systems such as conventional computer monitors. These systems, although giving an increased impression of reality are constrained significantly by the imaging system in providing a natural design environment in which to work. To counter this, there are 3D visualisation systems, such as the CAVE system supplied by the Virtual Environment Lab, Virginia Tech, Blacksburg Va. 24081, which provide the operator with a true 3D image along with haptic feedback. This is a fully immersive system consisting of a room, onto the walls of which are projected images that are viewed as 3D using a suitable headset. These systems, although useful for visualisation, are not currently suited for design work. Thus they would only be used practically for briefings, demonstrations etc, to provide a more impressive, or more memorable presentation.

According to the present invention there is provided a Human-Computer Interface that comprises a set of sensors, actuators and computer generated controls, characterised in that the controls are projected in three spatial dimensions by a three dimensional display device and are manipulated by means of an operator interacting with them by movements of the operator's body, these movements being detected using the sensor system, where characteristics of a displayed target volume change according to the movement made, and actuators worn on the body react according to how the body interacts with the computer generated controls.

The advantages of this invention are that a natural and intuitive interface is provided that has the effect of simplifying the process of designing articles using a Computer Aided Design (CAD) system. The interface as described herein provides tools that are capable of manipulating images very quickly and naturally. As the HCI will be used on a 3D display system that is connected to a computer system, this also enables remote users to access the system by means of having their own 3D display connected to the same computer system by means of a network system.

The present invention provides the operators with an environment in which they can operate and interact with the computer, and hence the displayed design article, more naturally than using the systems of the prior art. It is a practical system that is readily useable for the purpose of design, or for demonstration of a design, and is also suitable to be used to give briefings and presentations to non-technical staff or customers. The design article to be displayed, or manipulated by the current invention will generally comprise of a 3D image and is known in this specification as a target volume.

The present invention could be fitted on to an existing system that incorporates a 3D display and haptic interface such as the prior art described above to provide the user, or operator, with a set of controls that are operated in a natural, intuitive manner that allow various parameters of a target volume to be adjusted.

The hand and forelimbs will be the most common part of the body used to adjust controls but it will be understood that any part of the body may be used if the sensor system is capable of detecting the position of that part of the body. Any reference to "hand", and to "glove" in this specification should be read in this context.

The present invention provides a set of interactive 3D icons that act as controls to, amongst other things, resize the target volume, or rotate it or move it linearly, in any of 3 spatial dimensions. Certain special types of controls that are projected in two dimensional (2D) form, and are known in the context of this specification as menu items may be displayed along with the 3D controls and can be used to control additional functions of the computer system.

The controls may be projected alongside the target volume, and the purpose of manipulating the controls is to change the view of the target volume. The target volume itself may be a control, or may have controls within it such that the target volume may be manipulated directly, without reference to other controls.

In use, the operator would choose an appropriate control for the operation he wishes to perform, and would reach out towards it. He is able to see the position of his hand, and so knows where the chosen control is in relation to his hand position. The computer system is able to know the position of the operator's hand by virtue of the sensors attached to it, and so also knows where the hand is in relation to the controls being projected. When the system detects that the hand has "contacted" a control it sends a feedback signal back to the actuators on the glove which will move in response to this "contact". This is known as haptic feedback. There are generally two types of haptic feedback. The first, known as "force feedback" can act upon the hand to stiffen its movements with varying degrees of force, to simulate contact with different types of materials. A mild stiffness will tend to feel like the user is holding something spongy, or the stiffness could vary according to how far the fingers moved, which would simulate a rubbery texture. Of course, in this context, "contact" does not mean the actual touching of two physical objects, but instead refers to the apparent touching of the hand/glove combination, or other body part, with the 3D image of a control that is being projected by the projection system.

When a contact with the control takes place, the computer system will understand that some manipulation of the control is intended by the operator. Further movements of the operators hand while it is in contact with the control, or while the control interprets the hand movements as applying to it, will be interpreted as attempts to change one or more of the parameters that may be adjusted with that control. Such movements made by a hand may be, but are not limited to, fingers moving in relation to each other, fingers moving in relation to the palm, rotations of the hand etc. Some controls may require that two hands are needed in order to modify a particular parameter. The appearance of the control itself can change according to the value of the parameter that is adjusted by that control. For example, a control that adjusts the size of the target volume may itself get smaller or larger according to the value to which the parameter is presently set. Or, the control may be drawn such that it appears to be an image within an image, such that a smaller image appears to be encased within a larger one. As the parameter is adjusted the relative sizes or positions of the two images changes accordingly. As another example, the control could be drawn as a cylinder, with various parameter options drawn onto the surface of the cylinder. In use, the cylinder could be spun around using the hand, or other part of the body, until the desired parameter option can be conveniently chosen.

The usual image manipulation tools that are provided in more conventional CAD software may be beneficially adapted to work under this system.

The type of feedback applied to the hand will vary according to the type of control that is contacted. Some controls will react so that, when contact is made with them a signal is sent to the glove to lock the position of the fingers. This gives the impression to the operator of touching a solid object. Other controls will react with a lesser feedback force to give the spongy feeling described above. In the context of this specification this is known as grasping. Other controls operate differently. The operator is able to immerse his hand into this sort of control, and influence parameters by means of movements of his hand whilst within the control. These are known as gesture controls. Certain menu items may be displayed in two dimensions. If the operator were to bring his finger into contact with one of these menu items the glove will exert a mild pressure on the finger to simulate the feeling of touch. Although described here are three different haptic feedback mechanisms, they are not mutually exclusive—i.e. more than one can be used simultaneously if appropriate for the type of control being used.

Before the HCI can be used, it should be calibrated. This process is used to synchronise the position of the operator's body in space with the position as seen by the computer system. Any differences in position, or action such as grasping or gesturing as seen by the operator and the computer system is accounted for by the computer system such that the operator does not notice the error.

The HCI as described herein is capable of being used on a computer system that has a 3D display. Of course, the computer system need not be in direct proximity to the display, but could be connected across a network of interconnecting computers. Existing software and hardware tools ran be used to implement the HCI.

One example of such a HCI will now be described, with reference to the accompanying drawings.

DETAILED DESCRIPTION

Figure 1:
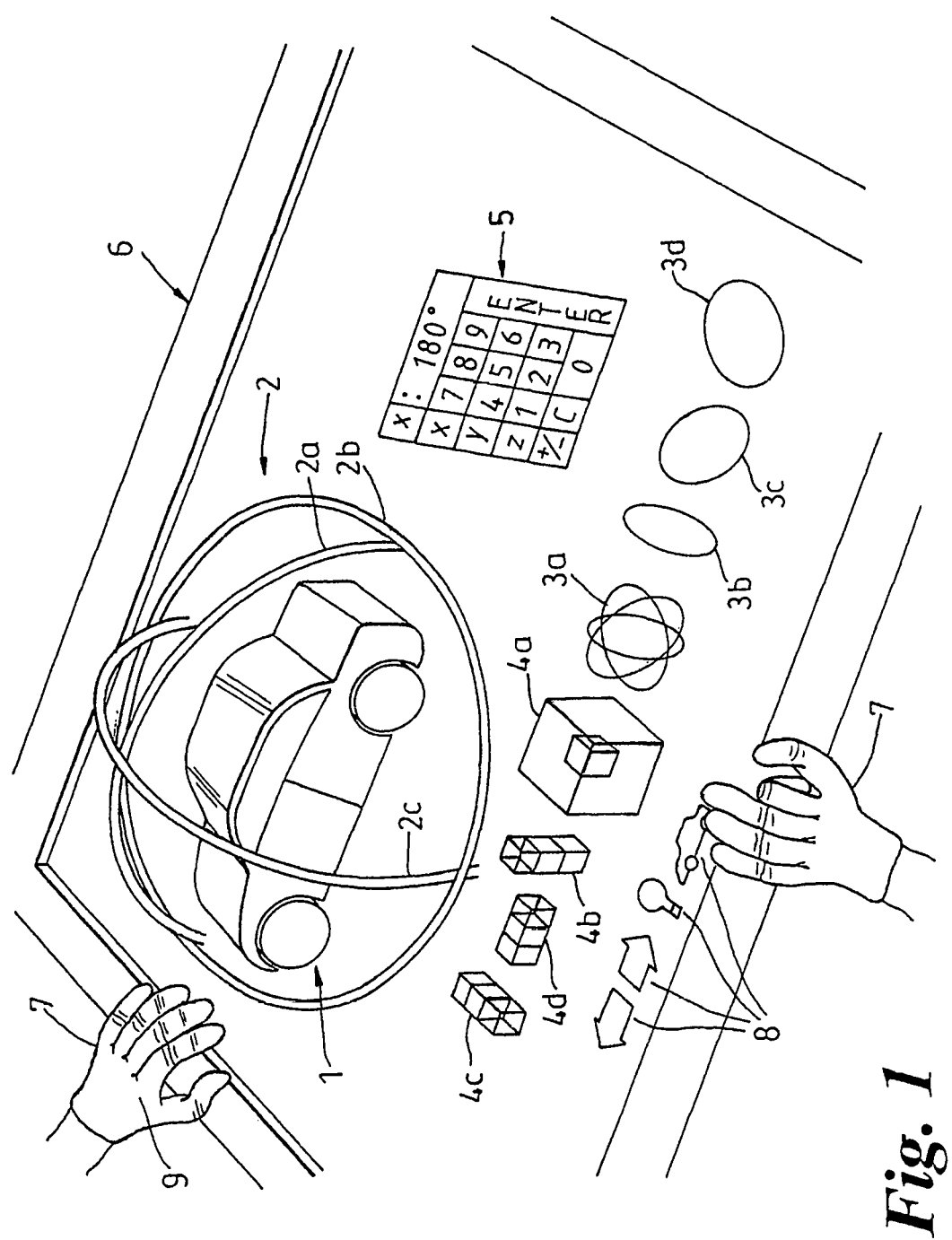
FIG. 1 shows a 3D workstation 6 displaying a target volume 1 and several controls 2, 3, 4, along with the hands of two operators 7.

The 3D workstation used is manufactured by Fakespace Labs, Inc. of 241 Polaris Ave. Mountain View Calif. 94043, USA, and provides a desk, above and upon which is presented a 3D image. The haptic feedback gloves are manufactured by Virtual Technologies Inc. of 2175 Park Boulevard, Palo Alto, Calif. 94306. The sensor system for detecting the position of the gloves and head in space is provided by Polhemus Inc. of 1 Hercules Drive, PO Box 560, Colchester, Vt., 05446.

The person operating the HCI wears haptic feedback gloves 9 that are fitted with an array of sensors and/or actuators. The system as currently employed has a separate glove incorporating the force feedback mechanism from the glove that incorporates the touch actuators, although these can also be incorporated into the same glove. These provide the computer system with information as to the position of the hands 7, and also exhibit forces on the fingers to provide feedback that simulates what is felt when touching or grasping objects.

Before the system can be used accurately the sensor system must first be calibrated. This is done by having the computer display a "virtual" hand in a position according to where it detects the operator's hand as being. The operator then moves his own hand, if necessary, to be closely aligned to the virtual hand, and then provides an indication to this effect to the computer.

The present system also requires that the gesture and grasping action is similarly calibrated. This is done by touching one's thumb against the end of each of the fingers in turn for each hand. The virtual hand display is then switched off. The computer then calculates any error in the original positioning and subtracts this error when performing its subsequent calculations.

The target volume 1 is surrounded by a rollcage 2 that comprises three loops, 2a, 2b. 2c. Each loop 2x is orthogonal to the other loops of the rollcage. The rollcage 2 acts as a control and can be used to rotate the target volume 1 about the centre of the rollcage 2. This can be accomplished by means of the operator grasping one of the loops 2x of the rollcage 2 with his hand, and manipulating the loop according to the movement required. For example, to rotate the target volume about the vertical axis, the operator will grasp one of the loops 2a, 2c that has a main vertical dimension and spin it sideways until the target volume shows the desired view. Or, the operator can grasp the horizontal loop 2*b* and rotate this. The design of the rollcage 2 is such that is can also be rotated by any of the loops 2*x* in any rotational axis. Here, "rotate" should be taken to mean that a gesture imitating that of rotating a physical ring is made.

FIG. 1 also shows some controls towards the bottom of the picture. Some of these controls can also be used to rotate the target volume 1. Controls 3*x*, of which 3*a* shows a rollcage in miniature, and 3*b*, 3*c* and 3*d* show each individual loop of the rollcage 3*a*, can also be used to rotate the target image in a similar manner to the full size rollcage 2. Loops 3*b*, 3*c* and 3*d* can be grasped by the operator and rotated, which will have the effect of rotating the target volume about that particular loop's axis. When the operator's hand 7 gets close enough to the control 3, actuators in the glove 9 operate to resist movement of the fingers, to simulate the touching of a solid object.

Also shown in FIG. 1 are four controls 4*x* that are used to resize the target volume 1. These are gesture icons. Each of these is drawn as a central cube with, in three cases 4*b*, 4*c*, 4*d*, shadow extensions in one dimension (all orthogonal to each other), and in the last case 4*a* a larger shadow cube enveloping a smaller one. To effect a resize, the operator places his hand 7 in contact with the chosen control and either moves his finger's to make a fist, or spreads his fingers out, which has the effect of making the target volume 1 smaller or larger respectively, Choosing a control with single dimension shadows will only resize the target volume 1 in that dimension, whereas choosing the control 4*a* with shadows in three dimensions will resize in all dimensions simultaneously.

FIG. 1 shows some other menu items 8 that are displayed in 2D format. When the operator's finger is brought into contact with one of these menu items the glove 9 will exert a mild pressure on the finger to simulate the feeling of touch. One such example of a 2D menu item is the keypad 5. This is used to input numerical data for any parameter that is capable of being controlled in this way.

All controls 2, 3, 4, 5, 8, and the target volume 1 are capable of being repositioned as desired by the operator, within the limitations of the display system 6, by grasping and pulling them to the desired position.

Figure 2:
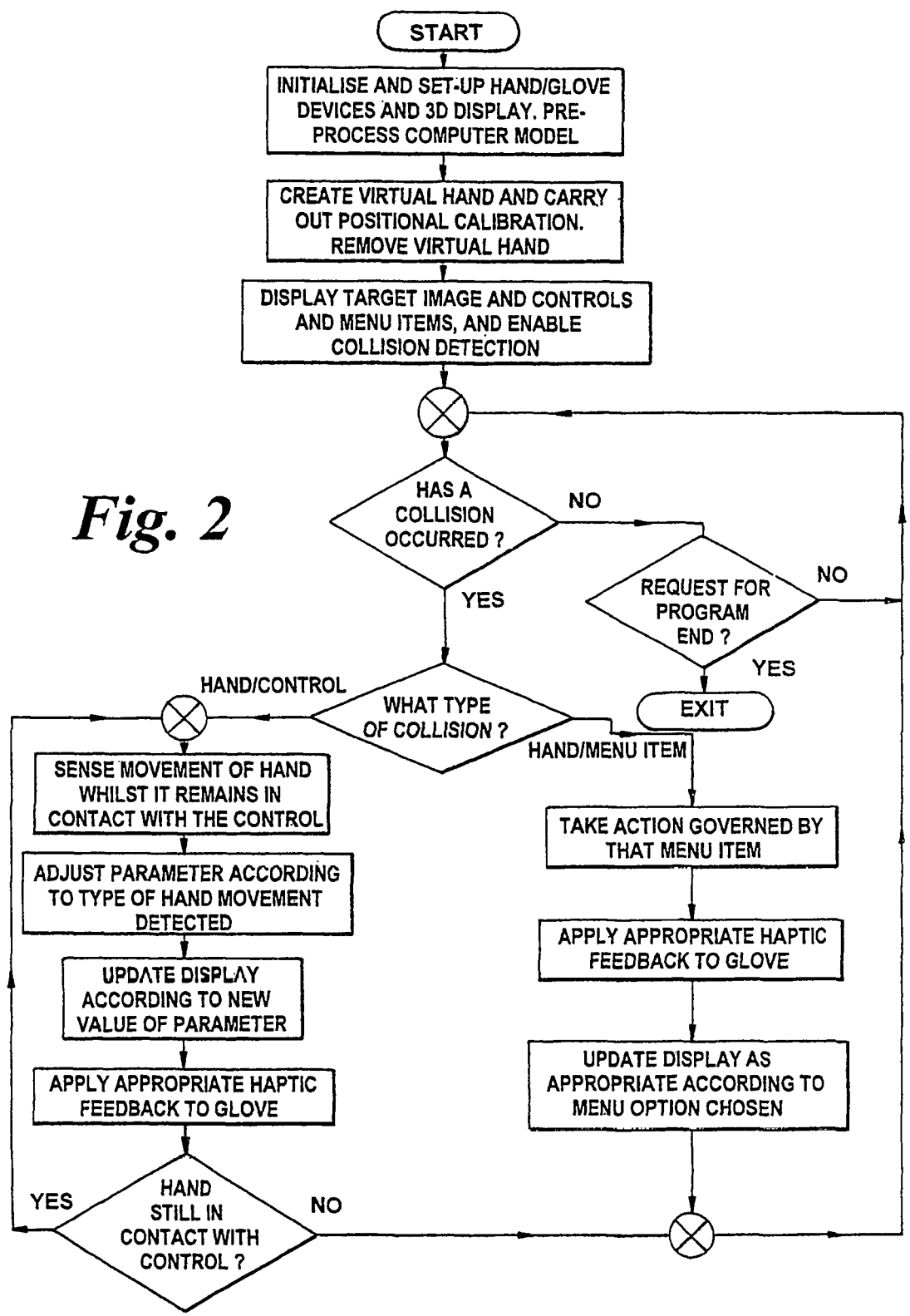
FIG. 2 shows in block representational form the functionality of the computer code that provides this HCI.

FIG. 2 shows a simplified schematic of the operation of the computer program that controls both the behaviour of the target volume and the controls and menu items projected by the 3D display. When the HCI computer code is activated the following steps are carried out:

a. Initialise body worn hardware, such as the gloves and any head gear that may be worn. Initialise sensor system. Pre-process the computer model that is to be used as the target volume such that it is prepared for display on the 3D display system. This is necessary so that it is provided with information on how to react with the haptic sensors within the gloves.

b. Initialise the 3D display unit, and create the image of a virtual hand for calibration purposes as described above. Carry out the calibration.

c. Display the 3D target volume and a set of controls and menu items. Enable the collision detection, i.e., activate the haptic feedback to the glove if it is sensed that the glove contacts with a control or menu item, and take appropriate action according to which control or menu item is contacted. Wait for collisions to occur or for the program to be ended.

d. If a collision is detected then take the following actions as appropriate:

e. If a hand-control collision, continue to sense the movements made by the hand as long as it stays in contact with the control. Adjust the parameter controlled by the control according to the movements made, and update the target volume display and control icon according to the new value of the parameter. Apply appropriate haptic feedback signals to the glove. Continue doing this process until it is detected that the hand is no longer in contact with the control.

f. If a hand-menu item collision, take the action governed by that menu item, and adjust the target value display and menu item icon as necessary. Apply appropriate haptic feedback signals to the glove.

g. Wait for more collisions to occur, or for program to be terminated. If a further collision is detected, then go back to step d. above.

The invention claimed is:

1. A system comprising:
a computer system including a display device; and
one or more sensors in communication with the computer system and configured to sense operator gestures by an operator;
wherein the computer system is configured to display, using the display device, computer-generated content above a surface, wherein the computer-generated content comprises a target volume image and a plurality of additional computer-generated images, and wherein the plurality of additional computer-generated images comprises a first additional computer-generated image comprising controls and a second additional computer-generated image for calibrating the operator gestures with interactions with the computer-generated content, wherein the computer system is further configured to allow said operator to directly view a portion of the operator's body concurrently with said second additional computer-generated image;
wherein the computer system is further configured to perform a calibration based on an indication from the operator that the portion of the operator's body as directly viewed by the operator concurrently with said second additional computer-generated image coincides with said second additional computer-generated image; and
wherein the computer system is further configured to, following the calibration, resize, rotate, or linearly move the target volume image in response to the operator gestures, wherein in the case that the target volume image is resized, rotated, or linearly moved at least a portion of the computer-generated content moves relative to the surface in accordance with a resizing, rotation, or linear movement of the target volume image.

2. The system of claim 1, wherein the one or more sensors include one or more actuators worn on the operator's hand.

3. The system of claim 2, wherein the second additional computer-generated image comprises a computer-generated image of a hand for alignment of the operator's hand with the computer-generated image of a hand.

4. The system of claim 1, wherein the plurality of additional computer-generated images include a gesture icon, and wherein the one or more sensors are configured to sense the operator gestures in reference to the gesture icon.

5. The system of claim 1, wherein the plurality of additional computer-generated images include a menu item, wherein the operator gestures comprises an operator interaction with the menu item.

6. The system of claim 1, wherein the computer system further includes an audio system, and wherein the computer system is further configured to allow the operator gestures to control the audio system.

7. A method, comprising:

detecting operator gestures by an operator;

displaying computer-generated content above a surface using a computer system including display device, the computer-generated content comprising a target volume image and a plurality of additional computer-generated images, and wherein the plurality of additional computer-generated images comprises a first additional computer-generated image comprising controls and a second additional computer-generated image for calibrating the operator gestures with interactions with the computer-generated content, wherein the computer system is configured to allow said operator to directly view a portion of the operator's body concurrently with said second additional computer-generated image;

calibrating the computer system based on an indication from the operator that the portion of the operator's body as directly viewed by the operator concurrently with said second additional computer-generated image coincides with said second additional computer-generated image; and following the calibrating, resizing, rotating, or linearly moving the target volume image in response to the operator gestures, wherein in the case that the target volume image is resized, rotated, or linearly moved at least a portion of the computer-generated content moves relative to the surface in accordance with a resizing, rotation, or linear movement of the target volume image.

8. The method of claim 7, wherein detecting the operator gestures includes detecting activation of one or more actuators worn on the operator's hand.

9. The method of claim 8, wherein the second additional computer-generated image comprises a computer-generated image of a hand for alignment of the operator's hand with the computer-generated image of a hand.

10. The method of claim 7, wherein the plurality of additional computer-generated images include a gesture icon, and wherein detecting the operator gestures includes detecting the operator gestures in reference to the gesture icon.

11. An apparatus, comprising:

means for sensing operator gestures by an operator;

a display device configured to project computer-generated content above a surface, the computer-generated content comprising a target volume image and a plurality of additional computer-generated images, wherein the plurality of additional computer-generated images comprises a first additional computer-generated image comprising controls and a second additional computer-generated image for calibrating the operator gestures with interactions with the computer-generated content, wherein the display device is arranged to allow said operator to directly view a portion of the operator's body concurrently with said second additional computer-generated image;

means for calibrating the sensing means based on an indication from the operator that the portion of the operator's body as directly viewed by the operator concurrently with said second additional computer-generated image coincides with said second additional computer-generated image; and means for identifying whether to resize, rotate, or linearly move the target volume image based on the operator gestures, wherein in the case that the target volume image is resized, rotated, or linearly moved at least a portion of the computer-generated content moves relative to the surface in accordance with a resizing, rotation, or linear movement of the target volume image.

12. The apparatus of claim 11, further comprising means for providing haptic feedback to the operator in response to the operator gestures.

13. The apparatus of claim 11, wherein the plurality of additional computer-generated images include a menu item, and wherein the operator gestures comprises an operator interaction with the menu item.

14. The apparatus of claim 11, wherein the sensing means is worn on the operator's hand, and wherein the second additional computer-generated image comprises a computer-generated image of a hand for alignment of the operator's hand with the computer-generated image of a hand.

* * * * *